(No Model.)

F. B. HERZOG.
IMITATION STAINED GLASS.

No. 286,434. Patented Oct. 9, 1883.

Witnesses.
Phillips Abbott
John Murray Mitchell

Inventor.
F. Benedict Herzog

UNITED STATES PATENT OFFICE.

F. BENEDICT HERZOG, OF NEW YORK, N. Y., ASSIGNOR TO EUGENE E. OUDIN, OF SAME PLACE.

IMITATION STAINED GLASS.

SPECIFICATION forming part of Letters Patent No. 286,434, dated October 9, 1883.

Application filed July 31, 1883. (No model.)

*To all whom it may concern:*

Be it known that I, F. BENEDICT HERZOG, of the city, county, and State of New York, have invented a new and useful Improvement in Imitation Stained Glass, of which the following is a full, clear, and exact description.

Reference is to be had to the accompanying drawings, forming part of this specification, in which similar letters of reference indicate corresponding parts in all the figures.

Figure 1:
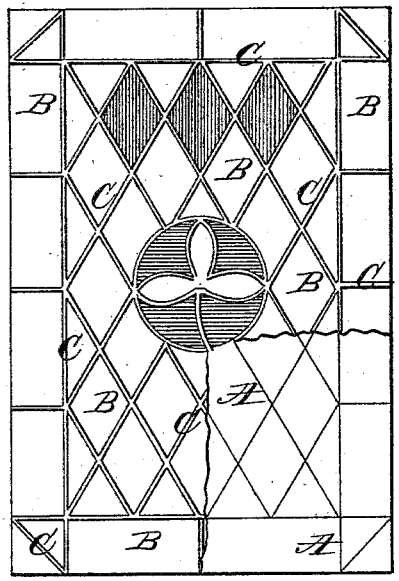
Figure 3:
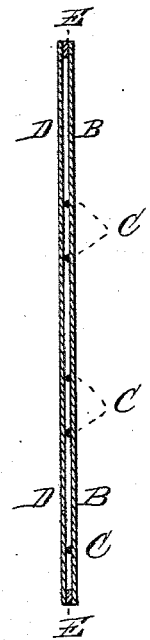
Figure 2:
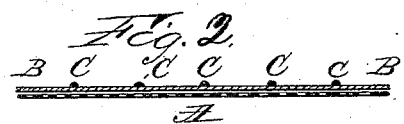

Figure 1 is a plan view of a plate of my imitation stained glass, shown as in process of manufacture, a part being broken away to show the design. Fig. 2 is a section of the same. Fig. 3 is a section of the same, shown as provided with a protecting-plate of glass.

The object of this invention is to provide a substitute for stained glass which will be comparatively inexpensive in manufacture.

The invention consists in imitation stained glass made with a glass plate having imitation leads applied to one side and the surface of the glass between the said imitation leads coated with transparent colored varnish or lacquer or any like substance, either simple or compound and either transparent or translucent. The imitation leads and the varnish or lacquer may be covered by a second glass plate, which serves as a protection-plate, whereby the said imitation leads and the varnish or lacquer will be protected from injury either by the weather or other causes, as will be hereinafter fully described.

Heretofore stained glass has ordinarily been made by placing pieces of stained glass of the desired colors and shapes in a frame, in which they have been "leaded" together, as it is called, and thus held in position; and by reason of the difficulty in producing stained glass of the desired colors and shapes, and also of the difficulty in fastening the pieces of glass in position, the genuine articles thus produced have been very expensive.

By my invention I am able to prepare at a comparatively small expense glass plates having the appearance and producing the effects of genuine stained glass by forming upon plates of plain glass an imitation of the colors of stained glass, and also of the leads by which the pieces of stained glass are usually held in position.

In carrying my invention into practical effect I form upon paper A, or other suitable material, any design which I wish to embody in the glass plates, which design represents the leads of genuine stained glass. I then place upon the design a plate, B, of plain glass, and pour upon or otherwise apply to the surface of the glass, along and directly over the lines of the design, from a suitable vessel or instrument, a small stream of a melted mixture, C, colored to represent the leads of an ordinary stained-glass plate. This mixture, when poured upon the surface of the glass, quickly cools and hardens and firmly adheres thereto, and produces upon the glass a representation of the design traced upon the paper A, resembling the leads of a stained-glass plate from which the pieces of stained glass have been removed. The mixtures which I have found best adapted for this purpose are composed of cements, sealing-wax, beeswax, Burgundy pitch, and, in short, any one of or a compound of the various waxes and cements found in the market for kindred purposes. I have found a good composition to be "Chacer's Cement," so called, which I render somewhat less brittle by melting with it, say, three per cent. of Burgundy pitch. These substances may be used singly or compounded one with the other, according to the judgment of the maker, and depending somewhat upon the wear, temperatures, shock, &c., to which the glass will be subjected. These ingredients and a suitable quantity of coloring-matter to give the desired color to the mixture are melted in a vessel or instrument of suitable form to allow the melted mixture to be slowly and regularly poured or discharged therefrom, or heated to the desired extent, if already fluid or partially fluid. After the mixture C has become sufficiently hard, I then pour, flow, or otherwise apply to the surface of the glass plate B and between the raised lines C of imitation leads transparent varnishes or lacquers, or other like substances, as aforesaid, and of the colors which I desire to have in the completed plates, so as to produce such a combination of colors as is seen in a genuine stained-glass plate, or any other desired combination of colors. With this construction the imitation leads C prevent the variously-colored varnishes, lacquers, &c., from coming in contact with each other.

In applying the varnishes or lacquers, &c., to the glass plate B, care should be taken that the said plate is not clouded, and for this reason I find it better not to apply or touch the varnishes or lacquers with a brush, but to leave the varnishes or lacquers in thin coatings or layers, such as can be produced by flowing them over the surface of the glass. Suitable colored varnishes and lacquers are found in the market, and from these and from others similarly prepared and colored to any desired shade the desired colors or shades of color can be produced upon the glass. Any transparent or translucent varnish or similar substance that will not be affected by the weather can be used. After the varnish has dried, if the glass plate thus prepared is held toward the light, it will be found to have the appearance of genuine stained glass. The imitation stained glass thus prepared can be set in frames, and can be placed in position with either side exposed to the outer air; but I prefer to arrange them with the smooth sides of the plates outward.

I do not limit myself to a fusible substance from which to make the imitation leads, nor to a substance requiring heat for its application. Any material may be used which may be caused to adhere to the surface of the glass and which projects beyond or above the surface of the glass, thereby producing sunken recesses in which the varnish, lacquer, &c., shall be applied, as stated. Nor do I confine myself to the application of the imitation leads to one side of the glass only. It may be applied to both sides, the leads being coincident in location on the glass; and the colored varnishes, &c., may be applied to one side only or to both; and the protecting coat of varnish hereinafter mentioned may be applied to both sides, if desired.

I prefer, in order to protect the leads, colored varnishes, &c., and also for the purpose of binding the whole together, to cover the ornamented surface with a heavy coat of varnish preferably, although not necessarily, colorless. I believe "Crockett's Preservative," so called, a suitable substance for this purpose. As an additional protection, I sometimes place upon the plate B of glass, prepared as hereinbefore described, a second plate, D, also of glass, resting upon the imitation leads C, so that the two plates may be as close together as possible. I then fasten the two plates B D together at their edges with cement, plaster-of-paris, E, or other suitable means, and the said plates can then be inserted in a frame. The combined plate thus formed has a hard, smooth surface upon both sides, and has the appearance of genuine stained glass, and can be used for windows and the various other purposes for which stained glass is used.

I am aware that it is not new to form opaque lines and leave transparent spaces between them on plain paper, and then paste this paper on glass window-lights; but

What I claim as new and of my invention is—

1. Imitation stained glass formed of glass coated directly on one face with the leaded lines and intermediate coloring, as shown and described.

2. A method of forming the leads on imitation stained glass, which consists in first placing a glass plate upon a pattern or design, and then depositing upon the glass and directly over the lines of the pattern a suitable substance, which shall adhere to and project above the surface of the glass, as described.

3. A method of manufacturing imitation stained glass, which consists in first forming the lead lines and then applying to the spaces between said lead lines transparent or translucent varnish or lacquer, colored or tinted, as described.

4. Imitation stained glass formed of two glass plates with intermediate lead lines and colored spaces, as shown and described.

5. A plate of glass having upon it a design or outline projecting from its surface, produced by applying to the glass an adhesive deposit of any suitable substance, substantially as and for the purposes set forth.

6. Imitation stained glass consisting of glass coated on both sides with coincident leaded lines and intermediate colored spaces, as shown and described.

7. The described method of binding the colored or tinted material in its recess, consisting in applying an external coat of varnish after the colored or tinted material has been applied to the glass, as set forth.

8. The described method of manufacturing imitation stained glass, consisting in melting the substance to be used for the leads, applying the same in raised lines to the glass, applying to the glass within the recesses thus produced a colored or tinted varnish or lacquer, and coating the entire plate thus prepared with a protecting material.

Signed at New York, in the county of New York and State of New York, this 28th day of July, A. D. 1883.

F. BENEDICT HERZOG.

Witnesses:
PHILLIP ABBOTT,
C. M. MITCHELL.